United States Patent [19]
Oberl et al.

[11] Patent Number: 5,161,572
[45] Date of Patent: * Nov. 10, 1992

[54] PRESSURE VALVE

[75] Inventors: Johann Oberl, Murr; Hermann Schmidt; Rolf Lutz, both of Reutlingen, all of Fed. Rep. of Germany

[73] Assignee: Robert Bosch GmbH, Stuttgart, Fed. Rep. of Germany

[*] Notice: The portion of the term of this patent subsequent to Jul. 23, 2008 has been disclaimed.

[21] Appl. No.: 679,032

[22] PCT Filed: Oct. 24, 1990

[86] PCT No.: PCT/DE90/00802

§ 371 Date: May 15, 1991

§ 102(e) Date: May 15, 1991

[87] PCT Pub. No.: WO91/07586

PCT Pub. Date: May 30, 1991

[30] Foreign Application Priority Data

Nov. 13, 1989 [DE] Fed. Rep. of Germany ....... 3937708

[51] Int. Cl.[5] .............................. F02M 59/46
[52] U.S. Cl. .................... 137/516.27; 137/543.23; 123/467
[58] Field of Search .............. 137/516.27, 540, 543.21, 137/543.23; 123/467, 506

[56] References Cited

U.S. PATENT DOCUMENTS

| | | | |
|---|---|---|---|
| 2,234,932 | 3/1941 | Schlaupitz | 137/516.27 |
| 2,706,490 | 4/1955 | Grieshaber et al. | 137/516.27 |
| 2,804,825 | 9/1957 | Mansfield et al. | 137/516.27 X |
| 2,922,581 | 1/1960 | Garday | 137/516.27 X |
| 3,965,876 | 6/1976 | Tissot | 123/467 |
| 4,467,767 | 8/1984 | Kampichler et al. | 123/467 |
| 4,577,606 | 3/1986 | Böhringer et al. | 123/467 X |
| 4,648,369 | 3/1987 | Wannenwetsch | 123/467 |
| 5,033,506 | 7/1991 | Bofinger et al. | 137/543.23 X |

FOREIGN PATENT DOCUMENTS

| | | | |
|---|---|---|---|
| 2306270 | 8/1974 | Fed. Rep. of Germany | 123/467 |
| 789234 | 1/1958 | United Kingdom | 123/467 |

Primary Examiner—John Rivell
Attorney, Agent, or Firm—Edwin E. Greigg; Ronald E. Greigg

[57] ABSTRACT

A pressure valve, which is installed in the delivery line leading from a fuel injection pump to a fuel injection valve, and which has a valve closing member opening in the direction of delivery, which is provided with a return collar. To achieve uniform injection, particularly a uniform curve of injection at a given load plotted against the speed, the opening rate of the connecting cross-section at the valve closing member is controlled by the guide part being provided immediately adjacent to the return collar, which guide part has three excisions at its circumference. These excisions are bounded by a flow channel guiding the valve closing member and have a defined flow cross-section of equal size, which in total is of the order of magnitude of the cross-section of the delivery line. With increasing stroke a total connecting cross-section is freed at the excisions by the boundary edge which limits the excisions at the side of the return collar and by the outlet edge of the flow channel, which connecting cross-section never becomes greater than the flow cross-section.

20 Claims, 2 Drawing Sheets

PRESSURE VALVE

STATE OF THE ART

The invention is directed to a pressure valve. In a pressure valve known from DE-AS 1 236 863, a return collar is separated from a second collar by an annular groove, which has at least one excision and in the present case two excisions. This excision is ground and remains within the transit bore in every position of the closing member of the pressure valve. The closing member has a conical sealing surface at the pump working space end and a fixed stop on the spring space side with which it is brought into contact on every opening stroke of the closing member by the action of a very soft compression spring. The excision provided on the closing member which therefore always has a constant flow cross-section, is formed as throttling cross-section. The object of this throttling cross-section is to move the pressure valve closing member more quickly to its closed position at the end of injection after the closing of the injection nozzle, since the pressure waves reflected in the delivery line meet a flow resistance at the throttling cross-section, which has the effect of a closing force on the closing member in support of the compression spring. Due to the different delivery rates or delivery speeds of the fuel through the pressure valve or the delivery line during idling on the one hand and full load operation at high speed on the other hand, the effect of the throttle area on the closing movement of the closing member decreases in the direction of idling as the pressure wave is relatively weak, so that the throttle cross-section offers a lower resistance to this pressure wave and more fuel can flow through the throttle per unit of time. The closing member is accordingly closed more slowly and thus during idling a larger proportion of the volume of the delivery line released by the closing valve is replaced by fuel from the pump working space than is the case during full load or part load operation, so that the reduction of pressure in the delivery line changes from the lowest amount during idling to the largest amount during full load operation.

Such a pressure valve is therefore used to control the residual pressure in the delivery line and to equalise the amount of fuel delivered in dependence on the injected quantity and the speed. The throttle acting during the spill stroke has at the same time an effect on the injection rate during the delivery phase of the fuel injection pump and reduces the quantity of fuel injected at full load with increasing engine speed.

In the case of a known pressure valve, where the closing member has a return collar and which do not come up against a fixed stop during each delivery process, the flow cross-section released in the transit bore by the closing member connected to the return collar on the side of the pump working space is made very large, particularly larger than the free cross-section of the connected delivery line. In such pressure valves, greatly varying quantities are injected when the high pressure delivery of the fuel injection pump is set at constant. These varying fuel injection quantities cannot be corrected by suitable setting of the effective delivery stroke of the pump piston, particularly in the case of a distributor injection pump, as all injection points of the internal combustion engine are supplied alternately from a single pump working space and accordingly the quantity control for all injection points must be equal, provided that no injection quantity control device is furnished which individually controls the injected quantity per delivery stroke of the pump piston. However such a control involves considerable expense. The quantity can also be influenced by other secondary measures, e.g. by limiting the stroke of the pressure valve, which again does not give the desired uniform effect over the whole operating range of the fuel injection pump and is also very expensive.

ADVANTAGES OF THE INVENTION

The pressure valve in accordance has an the advantage that the above-mentioned variations of quantities can be prevented by a simple measure. This affects in particular the opening behaviour of the pressure valve closing member. In the case of a pressure valve closing member which has in a known manner the return collar and an adjacent very large flow cross-section on the pump working space side, an annular connecting cross-section is created by the return collar emerging from the flow channel, which even with an emerging stroke of a few tenths of a millimetre frees a cross-section which is greater than the free cross-section of the adjoining delivery line. Due to the opening process there results from this an over-swing of the opening stroke in the direction of a connecting cross-section larger than would be necessary for delivery at the existing delivery rate. Because of the build-up of pressure in the delivery line, the pressure valve then swings back again and prevents delivery until it is pushed open again. Due to this oscillating process, there are breaks in the delivery characteristic during the duration of each delivery stroke of the pump piston or during the duration of injection. Depending on the lay-out of the delivery section at the individual injection points, varying quantity distributions are hereby produced and there are also quantity curves of varying wave-shape of the changing delivery rate plotted against speed, which leads to criticism. In the arrangement in accordance with the invention, the over-swing is prevented by the connecting cross-section between the pump working space and the delivery line being opened more slowly and continuously as the delivery rate increases, so that pressure peaks and pressure troughs during delivery which have led to a wave-shaped quantity curve in the pressure valve according to the state of art are avoided. At the same time the excision does not represent a throttling cross-section overall, as the average free cross-section can be increased with increasing delivery rate and the flow cross-section and hence the maximum connecting cross-section is approximately of the same size as the free cross-section of the delivery line. Due to the excisions being uniformly distributed over the circumference of the closing member and extending over the remaining length from the return collar, a fit with equalised forces and effortless movement is achieved in every position of the stroke of the closing member, so that one-sided wear and cavitation and functional defects after a long operating period are avoided.

DRAWING

Two embodiments of the invention are shown in the drawing and are explained in more detail in the following description. FIG. 1 shows a first embodiment, FIG. 2 shows a second embodiment of the pressure valve and FIG. 3 shows a section along line II—II through FIG. 2.

DESCRIPTION OF THE EMBODIMENTS

Figure 1:
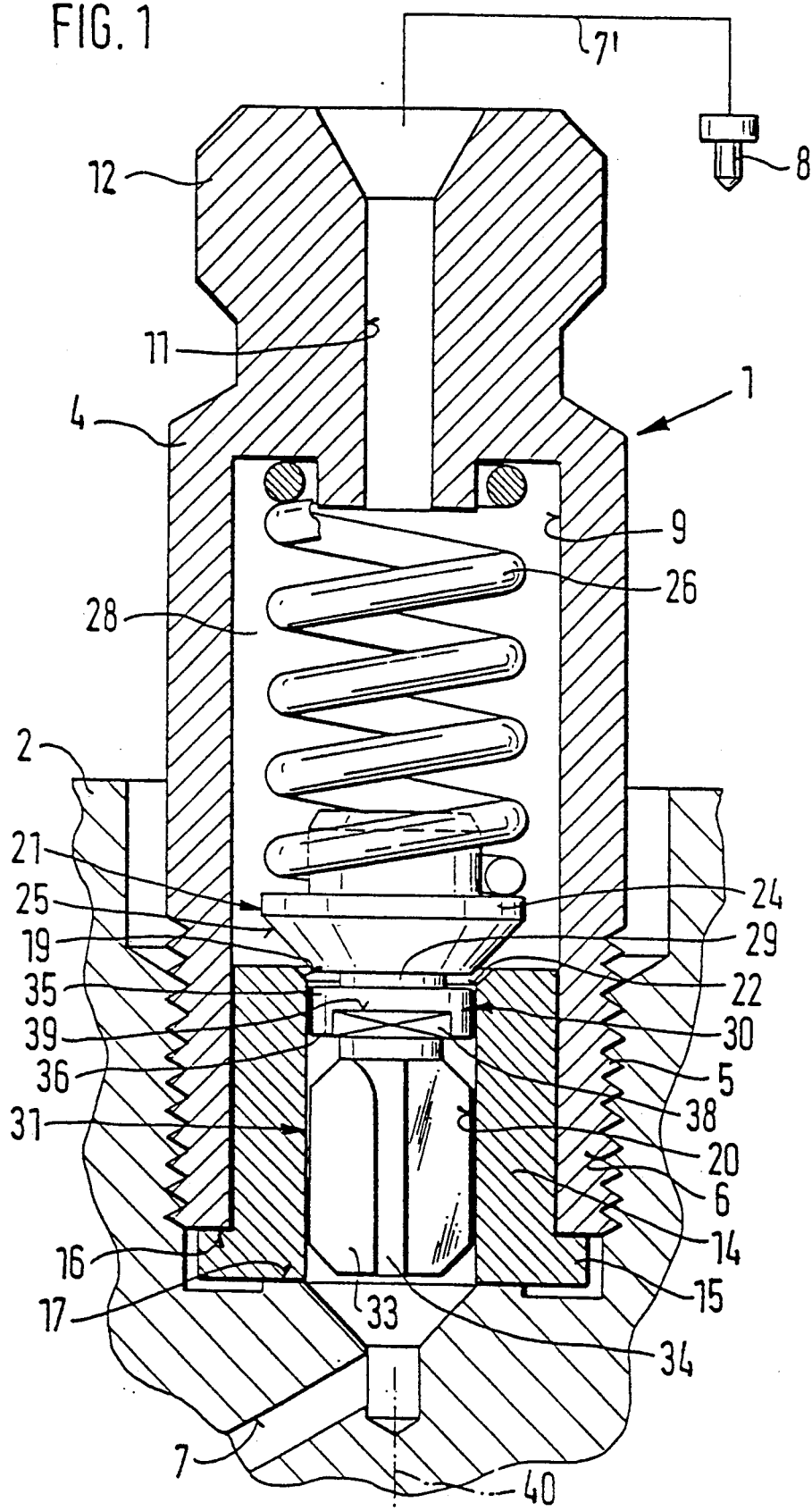

FIG. 1 shows a longitudinal section through pressure valve 1, which is screwed into housing 2 of a fuel injection pump not further shown, which is for example constructed according to DE-OS 36 44 595. The pressure valve 1 has a connecting fitting 4, which has an external thread 5 at one end and is screwed by this thread into a threaded hole 6 in the housing 2. A delivery line 7 from the pump working space of the fuel injection pump not further shown opens coaxially into the threaded hole. This has a connection through the pressure valve 1 to a further delivery line 7' to the end of which an injection valve 8 is connected. The connecting fitting 4 is substantially cylindrical and has an axial cylindrical recess 9 which is open towards the screwed side. Coaxially to the cylindrical recess 9 there emanates from it a connecting hole 11 which opens into a connecting nipple 12 of the connecting fitting and connects the recess 9 to the delivery line 7' or the injection valve 8.

A tube-shaped valve seat body 14 is inserted from the pump working space side end into the axial recess 9, which has a flange 15 on its pump working space side end, by which it is held onto a shoulder 17 at the bottom of the threaded hole 6 by the face 16 of the connecting fitting on the side of the pump working space. The valve seat body 14 has an axial flow channel 20 which at its outlet on the side of the recess 9 forms an outlet edge 22 which is gradually transformed into a conical valve seat 19. In the flow channel 20 a valve closing member 21 of the pressure valve is guided which has a head 24 with a cylindrical conical sealing surface 25 which comes into contact with the valve seat when the valve closing member is immersed in the flow channel 20. The head 24 of the valve closing member is acted on by the force of a compression spring 26, which bears against the face of recess 9 and attempts to keep the valve closing member in the closed position or in contact with the valve seat. The head of the valve closing member together with the valve seat therefore enclose a spring space 28 in the recess 9. The valve seat can however also be situated at the pump working space end of the flow channel 20, in which case the sealing surfaces are then provided at the corresponding end of the valve member.

The sealing surface 25 at the head of the valve closing member is limited by an annular groove 29 at the pump working space side, which is adjacent to a cylindrical collar 30 on the other side. This is so matched in diameter to the bore of the flow channel that it is movable in the flow channel in a leak-proof manner. A guide part 31 is joined to the collar on the pump working space side, and has guide fins 34 formed by excisions 33, sliding in the flow channel which ensure movement of the valve closing member without tilting. The excisions form between the guide fins flow cross-sections for fuel which arrives at collar 30 in the flow channel 20 through the delivery line 7.

The collar 30 is usually designated as a return collar or a relief collar and as described so far, the valve closing member corresponds to the known pressure valve with return collar. If high pressure delivery ensues from the pump working space, the cross-section of the valve closing member 21 is acted on by the high pressure and the valve closing member is moved against the force of the compression spring 26. At the same time the collar 30 emerges from the flow channel 20 and simultaneously displaces fuel into the delivery line 7', raising the residual pressure existing there ahead of the injection valve 8. Fuel injection follows when a certain pressure determined by the opening pressure of the injection valve is exceeded. As the collar 30 emerges, the fuel can flow past an annular connecting cross-section into the spring space 28 and further to the injection valve. At the end of the injection phase, the pressure in the pump working space drops. At the same time the closing member 21 returns to its closed position due to the effect of the compression spring, on the one hand, and the pressure existing in the delivery line 7' or in the spring space 28. The collar 30 is forced past the outlet edge 22 into the flow channel 20 and thus increases the volume enclosed between the pressure valve closing member and the injection valve from the time of the first part of collar 30 on the pump working space side being covered by the outlet edge 22, with simultaneous release of pressure. This method of operation is known and need not be described further here.

In contrast with the usual construction of such pressure valves, the collar 30 is now divided into a return collar 35 and a control collar 36. The control collar has on its circumference a excision 38 in the form of a ground region whose edge facing towards the head 24 is parallel to the outlet edge 22 and determines the height of the control collar 36. The control collar 36 seamlessly is transformed into the return collar 35.

The excision 38 can be a straight ground region or it can be a ground region with a circular boundary surface parallel to the centre line 40 of the valve closing member. The excision 38 forms a flow cross-section which is compact, due to the recess 38 being on one side in the control collar 36. Apart from a ground region, other compact forms of excisions are possible which together with the wall of the flow channel 20 form a flow cross-section.

In the pressure valve described here, the connecting cross-section between the delivery line 7 and the delivery line 7' is determined by the degree of emergence of the control collar 36 from the flow channel 20. When the closing member is lifted, the outlet edge 22 increasingly opens a connecting cross-section, which is determined by the product of the emergence stroke and the length of the limit of the excision 38 on the flow channel side. When the pressure valve is opened, the connecting cross-section between the delivery line sections 7 and 7' necessary for unobstructed delivery is produced by a stroke influenced by the flow cross-section 38. The flow cross-section which is formed between the excision and the flow channel 20, is as small as possible, but large enough to permit the fuel to flow through without obstruction at the highest delivery rate, as is also the case with the suitably dimensioned delivery line. This means that the maximum flow cross-section at the control collar is of approximately the same size as the flow cross-section of delivery line 7'. The pressure valve closing member must effect a longer stroke than was necessary with the state of the art discussed initially. The height of the control collar is such that part of it constantly remains within the flow channel 20 and therefore a desired maximum flow cross-section is certain to be retained. The construction in accordance with the invention therefore ensures that the highest quantity of injected fuel reaches the injection point unobstructed and that the connecting cross-section is matched to the prevailing delivery rate so that over-swings of the type initially described are avoided.

Due to the relatively long strokes necessary for control of the flow cross-section, a slight oscillation of the pressure valve closing member has no appreciable effect on the quantity of fuel injected or on the course of injection of this quantity.

Figure 2:
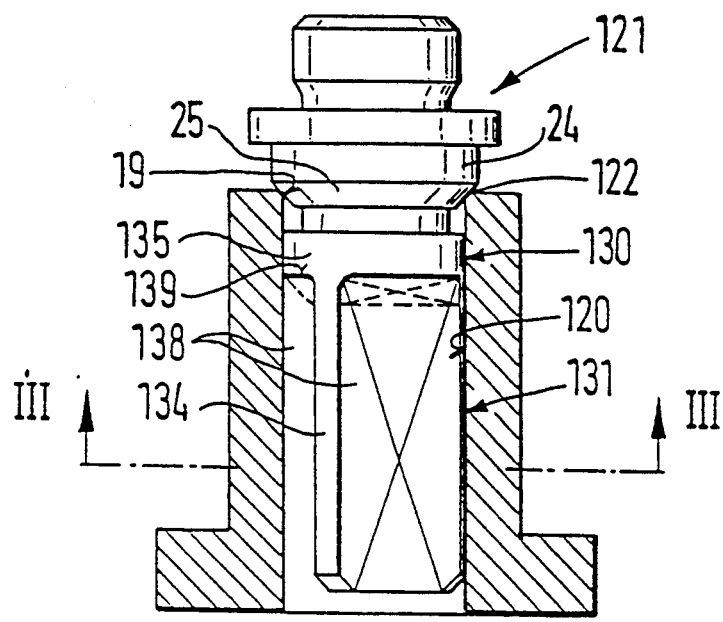
Figure 3:
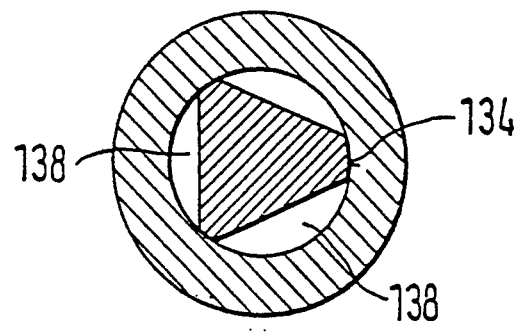

In a further embodiment in accordance with FIG. 2, the pressure valve closing member 121 has as the guide part 131 three guide fins 134 which are arranged at equal angular spacings of 120 degrees to one another and are formed from excisions 138 which are formed as ground regions with parallel axes in an otherwise cylindrical body. At the same time the return collar 135 is bounded on the pump working space side by the ground regions 138, with a bounding edge 139 corresponding to the bounding edge 39 in FIG. 1. Adjacent to this, the excisions 138 extend over the whole length of the adjacent guide part 131 on the pump working space side, which guide part 131 in this case also takes over the function of the control collar of the embodiment according to FIG. 1. The excisions together with the outlet edge 122 of the flow channel 120 act in the same way as in the embodiment according to FIG. 1, with the advantages already described with regard to FIG. 1.

Due to the uniform distribution of the excisions with each having a cross-section of equal size, an even force balance of the hydraulic forces acting on the pressure valve closing member 121 is obtained. This would also be achieved with a different number of excisions with a suitable uniform arrangement and dimensioning. However, it is particularly advantageous to provide three excisions. With an increasing number of excisions, the flow cross-sections would have to be made correspondingly smaller, whereby increasing throttling effects arise which is a disadvantage. An optimum in respect of equalisation of forces is achieved with the three excisions, while retaining the advantageous effects initially described. In this case also it is advantageous that the total of the cross-sections at the excisions 135 should never be greater than the flow cross-section of the delivery line.

For certain requirements, a known compensating throttle acting in dependence on the speed can be fitted up-stream of the ground regions or excisions, in order to match the injection to give a uniform course of injection under certain design conditions of the injection system. This can for example be effected in the form of a local excision on the return collar 135 or as a reduction in diameter of the return collar relative to the flow channel, in the form of an annular gap.

Finally, the ground region can be constructed with the cross-section increasing in the direction of the pump working space, in such a manner that it slopes over its whole length, but preferably only at the beginning, as shown dotted in FIG. 2. The rise can hereby be controlled in relation to the quantity or flow, and equalisation can be achieved. The sloping ground part can also be provided at only some of the three excisions.

We claim:

1. A pressure valve for installation in a delivery line (7, 7') between a pump working space of a fuel injection pump and a fuel injection point (8) in an internal combustion engine supplied by the fuel injection pump, said pressure valve includes a valve seat body (14) which has a valve seat (19) and a flow channel (20, 120), a closing member (21, 121) of the pressure valve (1) guided in said flow channel (20, 120) which closing member (21, 121) has a sealing surface (25) with which it is pressed in a closed position of the pressure valve onto the valve seat (19) adjoining the flow channel (20, 120) by a compression spring (26) braced in a fixed manner in a spring space (28) located on a side of the closing member facing away from the pump working space, which closing member further has a return collar (35, 135) which can be moved in a leak-proof manner in the flow channel (20, 120), which is immersed therein in a closed position and emerges from the flow channel (20, 120) on the spring space side when the pressure valve opens and with a passage part with a control collar matching the diameter of the flow channel, at the circumference of which control collar there are several excisions (38, 138) extending over the whole length of the control collar, which excisions (38, 138) together with the wall of the flow channel (20, 120) forms each flow cross-section, said excisions being distributed at equal angular spacings on the circumference of the closing member and having flow cross-sections of equal size, which excisions (38, 138) extend over the whole length of the closing member adjacent to the pump working space side and which together with an outlet edge (22) bounding the flow channel (20, 120) on the spring space side form a connecting cross-section between the pump working space and the delivery line 7 and the restoring force together with the cross-section of the flow channel and the total flow cross-section are so matched that with increasing fuel delivery rate the connecting cross-section is enlarged by the movement of the closing member (21, 121) against the force of the compression spring (26), whereby the connecting cross-section is always smaller than or the same size as the total flow cross-section.

2. A pressure valve in accordance with claim 1, in which the total flow cross-section of all flow cross sections of said excisions (38, 138) is approximately of the same size as the cross-section of the delivery line.

3. A pressure valve in accordance with claim 1, in which at the maximum delivery rate of the fuel injection pump a part of the control collar and of the length of the excisions (38, 138) always remains in the flow channel.

4. A pressure valve in accordance with claim 2, in which at the maximum delivery rate of the fuel injection pump a part of the control collar and of the length of the excisions (38, 138) always remains in the flow channel.

5. A pressure valve in accordance with claim 1, in which the closing member has a head (24, 124) on the spring space side on which the sealing surface (25) is formed, the sealing surface is conical and can be brought into contact with a suitably shaped conical valve seat (19) on the spring space side at the outlet of the flow channel (20, 120) by the compression spring (26) and the return collar (35, 135) is constructed on a part of the closing member adjacent to the sealing surface (25) and immerses in the flow channel (20, 120) and a guide part (34, 134) adjoins the return collar on the pump working space side which guide part (34, 134) is formed by said excisions (38, 138) extending in the axial direction of the flow channel (20, 120) on the outer surface of the closing member (21, 121).

6. A pressure valve in accordance with claim 2, in which the closing member has a head (24, 124) on the spring space side on which the sealing surface (25) is formed, the sealing surface is conical and can be brought into contact with a suitably shaped conical valve seat (19) on the spring space side at the outlet of the flow channel (20, 120) by the compression spring

(26) and the return collar (35, 135) is constructed on a part of the closing member adjacent to the sealing surface (25) and immerses in the flow channel (20, 120) and a guide part (34, 134) adjoins the return collar on the pump working space side which guide part (34, 134) is formed by said excisions (38, 138) extending in the axial direction of the flow channel (20, 120) on the outer surface of the closing member (21, 121).

7. A pressure valve in accordance with claim 3, in which the closing member has a head (24, 124) on the spring space side on which the sealing surface (25) is formed, the sealing surface is conical and can be brought into contact with a suitably shaped conical valve seat (19) on the spring space side at the outlet of the flow channel (20, 120) by the compression spring (26) and the return collar (35, 135) is constructed on a part of the closing member adjacent to the sealing surface (25) and immerses in the flow channel (20, 120) and a guide part (34, 134) adjoins the return collar on the pump working space side which guide part (34, 134) is formed by said excisions (38, 138) extending in the axial direction of the flow channel (20, 120) on the outer surface of the closing member (21, 121).

8. A pressure valve in accordance with claim 4, in which the closing member has a head (24, 124) on the spring space side on which the sealing surface (25) is formed, the sealing surface is conical and can be brought into contact with a suitably shaped conical valve seat (19) on the spring space side at the outlet of the flow channel (20, 120) by the compression spring (26) and the return collar (35, 135) is constructed on a part of the closing member adjacent to the sealing surface (25) and immerses in the flow channel (20, 120) and a guide part (34, 134) adjoins the return collar on the pump working space side which guide part (34, 134) is formed by said excisions (38, 138) extending in the axial direction of the flow channel (20, 120) on the outer surface of the closing member (21, 121).

9. A pressure valve in accordance with claim 1, in which the excisions are made as a ground region parallel to the centre line of the closing member.

10. A pressure valve in accordance with claim 2, in which the excisions are made as a ground region parallel to the centre line of the closing member.

11. A pressure valve in accordance with claim 3, in which the excisions are made as a ground region parallel to the centre line of the closing member.

12. A pressure valve in accordance with claim 5, in which the excisions are made as a ground region parallel to the centre line of the closing member.

13. A pressure valve in accordance with claim 1, in which at least one of the excisions is formed with the flow cross-section increasing in the direction of the pump working space.

14. A pressure valve in accordance with claim 2, in which at least one of the excisions is formed with the flow cross-section increasing in the direction of the pump working space.

15. A pressure valve in accordance with claim 3, in which at least one of the excisions is formed with the flow cross-section increasing in the direction of the pump working space.

16. A pressure valve in accordance with claim 5, in which at least one of the excisions is formed with the flow cross-section increasing in the direction of the pump working space.

17. A pressure valve according to claim 13, in which at least one of the excisions is made stepped with the flow cross-section increasing in the direction of the pump working space.

18. A pressure valve according to claim 14, in which at least one of the excisions is made stepped with the flow cross-section increasing in the direction of the pump working space.

19. A pressure valve according to claim 15, in which at least one of the excisions is made stepped with the flow cross-section increasing in the direction of the pump working space.

20. A pressure valve according to claim 16, in which at least one of the excisions is made stepped with the flow cross-section increasing in the direction of the pump working space.

* * * * *